United States Patent
Abramson

[15] 3,641,314
[45] Feb. 8, 1972

[54] TIME CODED, COIN CONTROL GATE SYSTEM

[72] Inventor: Aaron L. Abramson, 1611 Audubon St., New Orleans, La. 70118

[22] Filed: Apr. 10, 1970

[21] Appl. No.: 27,347

[52] U.S. Cl. .........................................235/61.8 A, 340/51
[51] Int. Cl. .....................................G06k 15/18, G08g 1/14
[58] Field of Search ...............194/DIG. 23, 4, 9; 235/61.6 R, 235/61.7 B; 340/51, 31, 149 A; 179/90 CS

[56] References Cited

UNITED STATES PATENTS 3,484,586   12/1969   Wilson et al.........................194/9 R X Primary Examiner—Daryl W. Cook
Attorney—Clarence A. O'Brien and Harvey B. Jacobson

[57] ABSTRACT

The exit gate of a vehicle parking facility is opened in response to deposit of the proper coinage in a multiprice, coin mechanism. The coinage value is set and read out in suitable form when a time encoded card is inserted into a card receiving unit. The card is withdrawn by the vehicle operator from a ticket dispenser when entering the parking facility.

10 Claims, 4 Drawing Figures

PATENTED FEB 8 1972          3,641,314

Aaron L. Abramson
INVENTOR.

BY Clarence A. O'Brien
and Harvey B. Jacobson
Attorneys

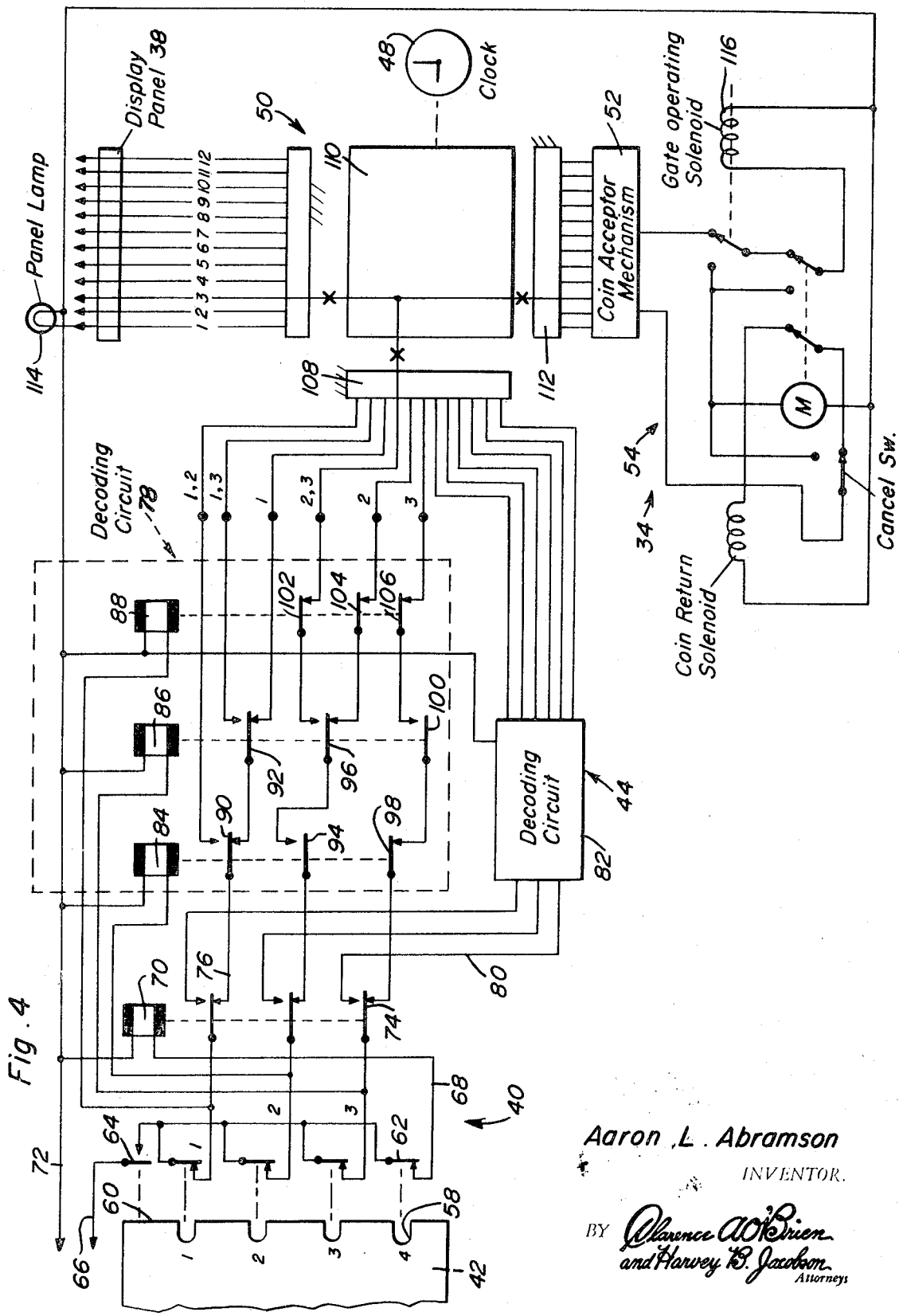

TIME CODED, COIN CONTROL GATE SYSTEM

This invention relates to automatically controlled access and exit to and from parking lots or the like.

Gate controlling systems for parking facilities are well known as well as parking time metering systems for determining the appropriate parking charge. Despite the use of such systems, parking facilities require personnel for collecting the appropriate parking charge. The only instant where collection of parking charges by personnel is eliminated, is where the vehicle operator is required to deposit a fixed amount of coinage in a parking meter for a preset period of time. It is therefore an important object of the present invention to provide an automatic system for parking facilities utilizing commercially available parking lot components whereby a vehicle may park for any desired length of time and the appropriate parking charge may be collected upon departure of the vehicle from the parking facility without the use of any personnel.

In accordance with the present invention, a vehicle operator withdraws a time encoded card from a ticket dispenser when entering the parking facility. Withdrawal of the time encoded card from the dispenser opens an entrance gate. When leaving the parking facility, the time encoded card is inserted into a ticket receiver within which the time record is decoded by means of signal path selecting decoders and compared with the current time in order to compute the parking charge in accordance with a given parking charge rate by selection of pricing circuits associated with a commercially available coin acceptor machine. The parking charge is then read out by registration, on a display panel, for example, to inform the vehicle operator so that he may insert the proper amount of coinage or other exchange medium into a coin machine through which operation of the exit gate is controlled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is an electrical circuit diagram corresponding to the system as schematically illustrated in FIG. 3.

Figure 1:
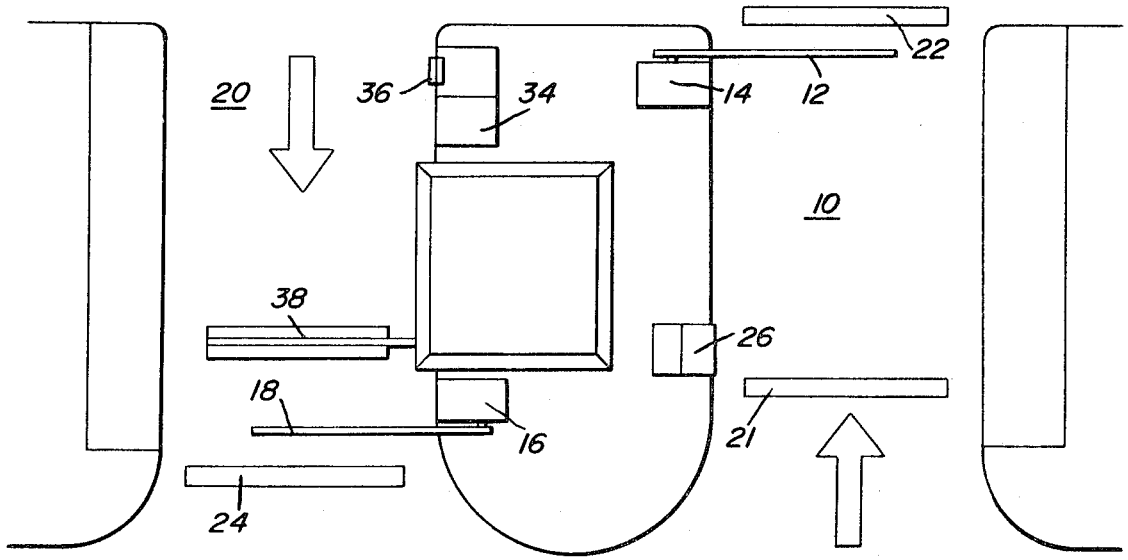
FIG. 1 is a top plan view showing a typical apparatus layout for a parking control system in accordance with the present invention.

Referring now to the drawings in detail, and initially to FIG. 1, the entrance and exit layout for a typical parking facility is illustrated whether it be an open parking lot or a closed parking building. An entrance passageway generally referred to by reference numeral 10 leads to the parking zones and is of a width to permit passage of an automotive vehicle. The passageway 10 is normally blocked by a gate 12 that extends from a gate operating mechanism 14 of any well-known type. An example of such a gate operating mechanism is Model 400 PL Gate manufactured by Parking Controls Division of Western Industries, Incorporated, of Chicago, Ill. A similar operating mechanism 16 for an exit gate 18 is mounted so that the exit gate 18 normally blocks exit from an exit passageway 20. Detectors 22 and 24 are associated with the gate operating mechanism in order to effect closing of the gates when a vehicle passes through the entrance passageway 10 or leaves the exit passageway 20. Either a treadle-type detector or a presence-type detector, both of which are commercially available could be used.

Figure 2:
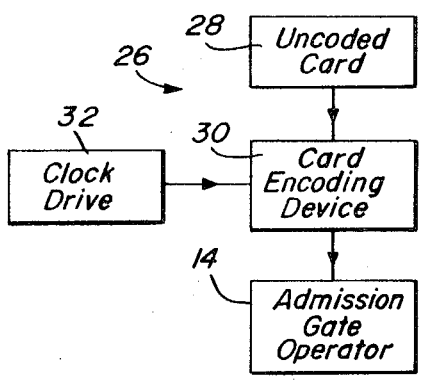
FIG. 2 is a schematic block diagram illustrating a portion of the parking control system.

Opening of the entrance gate 12 is effected upon withdrawal of a record medium in the form of a ticket or card from a ticket dispenser 26 positioned on one side of the entrance passageway 10 in front of the entrance gate operating mechanism 14 as depicted in FIG. 1. Ticket dispensers of this type are also well known, as for example Model TD 2.56 RC-WTP-, manufactured by Parking Controls Division of Western Industries, Inc. aforementioned. A detector 21 positioned forwardly of the dispenser is operative to time code a card and partially eject it when a vehicle passes over the detector. This type of ticket dispenser as diagrammatically illustrated in FIG. 2, includes a supply of uncoded cards 28 each of which is time coded by a time encoding device 30, the time encoding device being driven by a clock drive 32. Withdrawal of the partially ejected, time coded card effects opening of the entrance gate 12 through the gate operating mechanism 14.

The exit gate 18 is also opened by its gate operating mechanism 16 when a proper exchange medium is deposited into a machine 34 positioned in front of the gate operating mechanism 16 in the direction of travel as shown in FIG. 1. The machine 34 controlling operation of the gate operating mechanism may be of a commercial type of coin accepting machine such as 13-03-005 Multiprice SCS Accumulator, manufactured by National Rejectors, Inc. The price associated with the machine 34 is set under control of a ticket receiver 36 mounted adjacent thereto and into which the time coded card is adapted to be inserted by the vehicle operator as the vehicle enters the exit passageway 20. Upon insertion of the time coded card, not only is the coin machine 34 set to accept an amount of coinage dependent upon the parking time but the corresponding parking charge is visually displayed on a display panel 38 appropriately positioned for viewing by the vehicle operator when entering the exit passageway 20. Thus, the vehicle operator is informed of the correct amount of coinage to deposit in the coin machine 34 necessary to cause opening operation of the exit gate 18.

Figure 3:
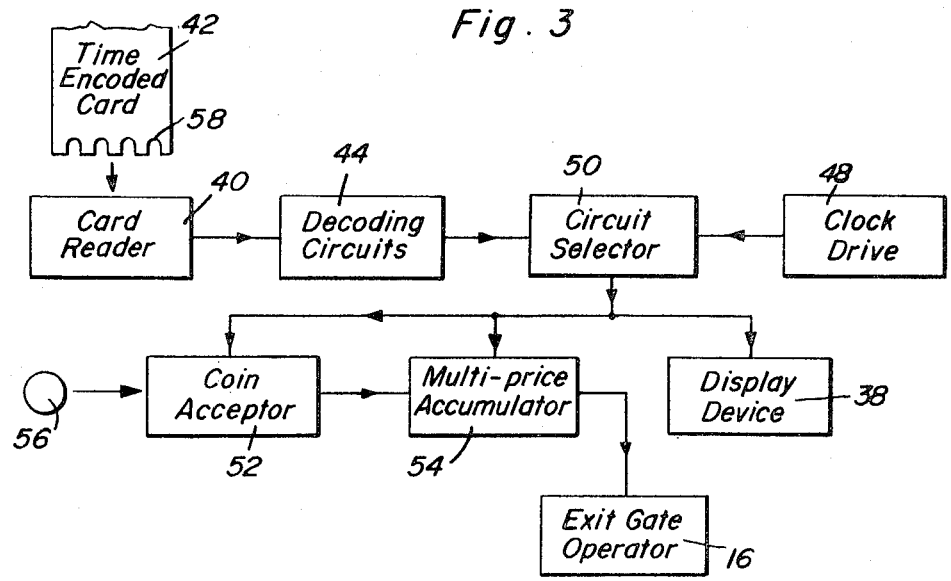
FIG. 3 is a schematic block diagram illustrating the remaining portion of the parking control system.

As diagrammatically shown in FIG. 3, the ticket receiver 36 includes a card reader component 40 into which a time coded card 42 is adapted to be inserted. When inserted, time signals derived from the coding on the card 42 are generated by the reader 40 and decoded by the decoding component 44. The decoded timing signals are compared with the output of a clock drive 48 by a circuit selector component 50 in order to determine the elapsed time between entrance and exit from the parking facility. Based upon the elapsed time, the coin machine is set. At the same time, the corresponding parking charge is displayed by the device 38 as aforementioned. Thus, upon deposit of the proper amount of coinage 56 as diagrammatically shown in FIG. 3, into the coin acceptor 52, the accumulator 54 is operative to open the exit gate 18 through the exit gate operating mechanism 16.

It will be apparent, that the card 42 withdrawn from the ticket dispenser is one form of time coded record medium that may be utilized in accordance with the present invention. The coding of the record medium may take various forms including magnetic coding, hole punching, or edge notching 58 as shown in FIG. 3. The reader component 40 must of course be capable of reading the particular type of coding utilized. With respect to the coin machine and the coinage 56 adapted to be inserted thereinto, it should also be appreciated that other exchange medium may be utilized including tokens and paper currency with appropriate apparatus for handling the particular type of exchange medium utilized.

FIG. 4 illustrates one embodiment of logic apparatus designed to handle cards 42 time coded by notches 58. Where no more than four time coding notches 58 are provided on one edge 60 of card 42 as shown in FIG. 4, different combinations of notches at the four numbered locations correspond to 12 time periods as shown for example on the following coding chart:

| Time Period | Notches 1 | 2 | 3 | 4 |
|---|---|---|---|---|
| 1 | X | | | |
| 2 | | X | | |
| 3 | | | X | |
| 4 | X | X | | |
| 5 | X | | X | |
| 6 | | X | X | |
| 7 | X | | | X |
| 8 | | X | | X |
| 9 | | | X | X |
| 10 | X | X | | X |

|    |   |     |   |
|----|---|-----|---|
| 11 | X |  X  | X |
| 12 |   | X X | X |

When the time coded card is inserted into the reader component 40, the edge 60 will open four normally closed, notch sensing switches 62 if no notch 58 is formed on the coded edge 60 in alignment with an associated switch. The sensing switches 62 are connected in parallel to the stationary contact of a normally opened card sensing switch 64 adapted to be closed by the edge 60 whenever a card is inserted in order to connect each of the sensing switches 62 to one of the power lines 66 connected to a suitable source of electrical energy. The stationary contacts associated with the sensing switches 62 are connected to signal output lines 68. The signal output line 68 associated with the number four position sensing switch is connected to one side of a relay coil 70, the other side of which is connected to the other power line 72. Relay coil 70 controls a plurality of relay switches 74 normally engaged with contacts connected to three input signal lines 76 to a decoding circuit 78. The normally disengaged contacts associated with the relay switches 74, are connected through three signal input lines 80 to a second decoding circuit 82. Thus, the sensing switch 62 associated with position No. 4, controls the coding circuit through which signals are transmitted from the reader component 40.

Each of the decoding circuits 78 and 82 are similar in arrangement and operation. Referring for example to the decoding circuit 78, the signal output lines 68 from the sensing switches associated with notch positions 1, 2 and 3, are connected to three relay coils 84, 86 and 88. Thus, when the card 42 is inserted, any one or more of the relay coils 84, 86 and 88 connected to the power line 72 will be energized in order to actuate associated relay switches. The relay coil 84 is associated with a relay switch 90 normally engaging a contact connected to a relay switch 92 associated with the relay coil 86. A second relay switch 94 is associated with the relay coil 84 normally disengaged from a contact connected to a second relay switch 96 associated with the relay coil 86. A third relay switch 98 is associated with relay coil 84 normally engaging a contact connected to a third relay switch 100 associated with the second relay coil 86. The normally disengaged contact associated with the relay switch 96 is connected to a first relay switch 102 associated with the third relay coil 88 while the normally engaged contact associated with the relay switch 96 is connected to the second relay switch 104 associated with relay coil 88. A third relay switch 106 associated with relay coil 88 is connected to the normally disengaged contact associated with relay switch 100. Six output signal lines therefore extend from the normally disengaged contact of relay switch 90, normally disengaged contact of relay switch 92, normally engaged contact of relay switch 92, normally engaged contact of relay switch 102, normally engaged contact of relay switch 104 and normally engaged contact of relay switch 106. Similarly, six output signal lines extend from the other decoding circuit 82. The total of 12 output signal lines correspond to the 12 time periods aforementioned and by means of the decoding circuits, a conductive path is established through one of the 12 output signal lines from the reader component 40 dependent upon the combination of notches on coded edge 60 detected by the reader component as shown in the coding chart aforementioned.

The 12 signal output lines as shown in FIG. 4, are connected to a stationary contact brush assembly 108 having 12 contacts in wiping engagement with a circuit selecting rotor 110 in the circuit selector component 50. The rotor is adapted to be driven by the clock drive 48 synchronized with the clock drive 32 of the time encoding device in the ticket dispenser 26. The rotor 110 is provided with wiping contacts so as to engage one of the 12 output signal contacts on the stationary brush assembly 108 dependent upon the angular position of the rotor. The rotor is also in wiping engagement with an annular brush assembly 112 through which one of 12 pricing circuits are selected, said pricing circuits being connected to the coin acceptor mechanism 52 and the display panel 38 provided with a plurality of panel lamps 114. Thus, the angular position of the rotor 110 reflecting the time at which a time coded card is inserted into the reader 40, determines the elapsed time between encoding of the card and reading of the card to select a pricing circuit which is displayed by illumination of an appropriate panel lamp indicating a corresponding parking charge and by setting of the coin machine 34 through the coin acceptor mechanism 52. When a corresponding value of coinage is inserted into the coin acceptor mechanism 52, the multiprice accumulator 54 will be rendered operative to pulse the gate operating solenoid 116 associated therewith resulting in opening of the exit gate 18 through its operating mechanism 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an exit gate, power operating mechanism, record receiving means having a plurality of code sensing devices responsive to reception of a time encoded record medium for generating signals to register entry time, and variable price control means operatively connected to the power operating mechanism for opening the gate in response to reception of a selected value of exchange medium, logic means operatively connecting the record receiving means to the price control means for selecting said value of exchange medium in accordance with time elapsed since the entry time registered by the record receiving means, comprising a plurality of signal paths controllably connected to some of the code sensing devices, relay means connected to the other of the code sensing devices for changing the signal paths to which the first mentioned code sensing devices are connected, and time controlled selector means connected to said signal paths for transmitting the signals to selected pricing circuits connected to the variable price control means.

2. The combination of claim 1, wherein said record medium is a card on which entry time is recorded in code form.

3. The combination of claim 1 wherein said selector means includes a stationary brush contact assembly to which said signal paths are connected, a clock driven rotor having contacts in wiping engagement with the brush contact assembly and a second brush contact assembly to which the pricing circuits are connected and with which the contacts on the rotor are engageable.

4. In combination with a cash acceptor mechanism to which a plurality of pricing circuits are connected, means for selecting one of the pricing circuits in accordance with time encoded on a record card, comprising at least one decoding circuit for establishing a plurality of signal paths, time comparison means sequentially connecting said signal paths to corresponding pricing circuits, and card reading means responsive to reception of the record card for selecting one of the signal paths, said reading means including a source of current, a plurality of code sensing devices connected in parallel to the decoding circuit and card sensing means responsive to detection of the record card for connecting the source of current to the code sensing devices.

5. The combination of claim 4 including a second decoding circuit connected to the time comparison means for establishing additional signal paths, said reading means including relay means responsive to actuation of one of the sensing devices for selecting one of the decoding circuits to which the other of the sensing devices are connected.

6. The combination of claim 5 wherein each of said decoding circuits includes a plurality of relay devices respectively energized by different ones of the sensing devices, each of the relay devices having relay switches, the relay switches of the respective relay devices being interconnected in series between the sensing devices and the time comparison means to form said signal paths.

7. The combination of claim 6 wherein said time comparison means comprises a clock driven rotor and brush assemblies in wiping engagement with the rotor and connected to the decoding and pricing circuits.

8. The combination of claim 4 wherein said decoding circuit includes a plurality of relay devices respectively energized by different ones of the sensing devices, each of the relay devices having relay switches, the relay switches of the respective relay devices being interconnected in series between the sensing devices and the time comparison means to form said signal paths.

9. The combination of claim 4 wherein said time comparison means comprises a clock driven rotor and brush assemblies in wiping engagement with the rotor and connected to the decoding and pricing circuits.

10. The combination of claim 9 for use in a controlled parking facility having power operated gates and a time encoding card dispenser synchronized with the clock driven rotor.

* * * * *